US007831140B2

(12) United States Patent
Park et al.

(10) Patent No.: US 7,831,140 B2

(45) Date of Patent: Nov. 9, 2010

(54) APPARATUS FOR AUTO FOCUSING

(75) Inventors: Chan Woo Park, Gyunggi-Do (KR); Kyoung Soo Kwon, Gyunggi-Do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 198 days.

(21) Appl. No.: 12/140,954

(22) Filed: Jun. 17, 2008

(65) Prior Publication Data

US 2009/0003818 A1 Jan. 1, 2009

(30) Foreign Application Priority Data

Jun. 27, 2007 (KR) ..................... 10-2007-0063652

(51) Int. Cl.
*G03B 3/10* (2006.01)
*G03B 13/34* (2006.01)

(52) U.S. Cl. ...................................... 396/133; 348/357

(58) Field of Classification Search ................. 396/125, 396/129, 133, 136, 303; 348/257, 357; 359/697, 359/698

See application file for complete search history.

(56) References Cited

U.S. PATENT DOCUMENTS

| | | | |
|---|---|---|---|
| 5,917,266 A | 6/1999 | Murai et al. | |
| 2003/0012565 A1 | 1/2003 | Otani et al. | |
| 2003/0114278 A1 | 6/2003 | Rigas | |
| 2004/0150431 A1 | 8/2004 | Ito et al. | |
| 2005/0102334 A1 | 5/2005 | Honda | |
| 2009/0021848 A1* | 1/2009 | Lee | 359/824 |
| 2009/0022487 A1* | 1/2009 | Weng et al. | 396/133 |

FOREIGN PATENT DOCUMENTS

| | | |
|---|---|---|
| JP | 09-043480 A | 2/1997 |
| JP | 10-116121 A | 5/1998 |
| JP | 2000-295101 A | 10/2000 |
| JP | 2002-034264 A | 2/2002 |
| JP | 2004-228860 A | 8/2004 |
| JP | 2005-094108 A | 4/2005 |
| JP | 2005-167972 A | 6/2005 |
| JP | 2006-023555 A | 1/2006 |
| JP | 2006-48082 A | 2/2006 |
| JP | 2006-081356 A | 3/2006 |
| JP | 2007-047731 A | 2/2007 |

OTHER PUBLICATIONS

Japanese Patent Office Action issued Jul. 21, 2009.

* cited by examiner

*Primary Examiner*—Melissa J Koval
*Assistant Examiner*—Autumn Parker
(74) *Attorney, Agent, or Firm*—Lowe Hauptman Ham & Berner LLP

(57) ABSTRACT

There is provided an apparatus for auto-focusing including: a sensing unit sensing a current position of a lens moving within a predetermined range along a moving shaft; an A/D converter converting a lens position value from the sensing unit into a digital signal; a lens position control unit generating a signal for moving the lens to a target lens position determined by an auto-focusing algorithm; a driving signal generating unit generating a square wave signal according to the signal from the lens position control unit; and an operation unit connected to the A/D converter and controlling a time at which the A/D converter performs conversion according to the square wave signal from the driving signal generating unit.

6 Claims, 4 Drawing Sheets

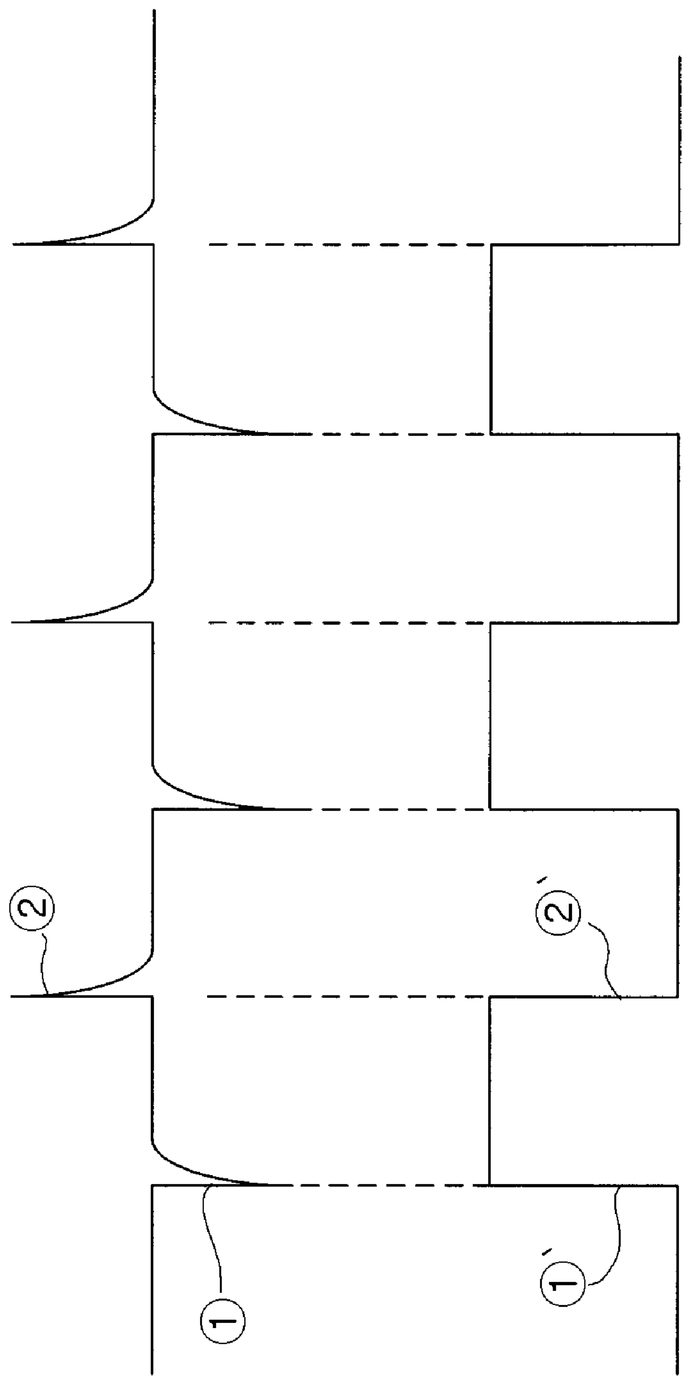
PRIOR ART
FIG. 1A
PRIOR ART
FIG. 1B

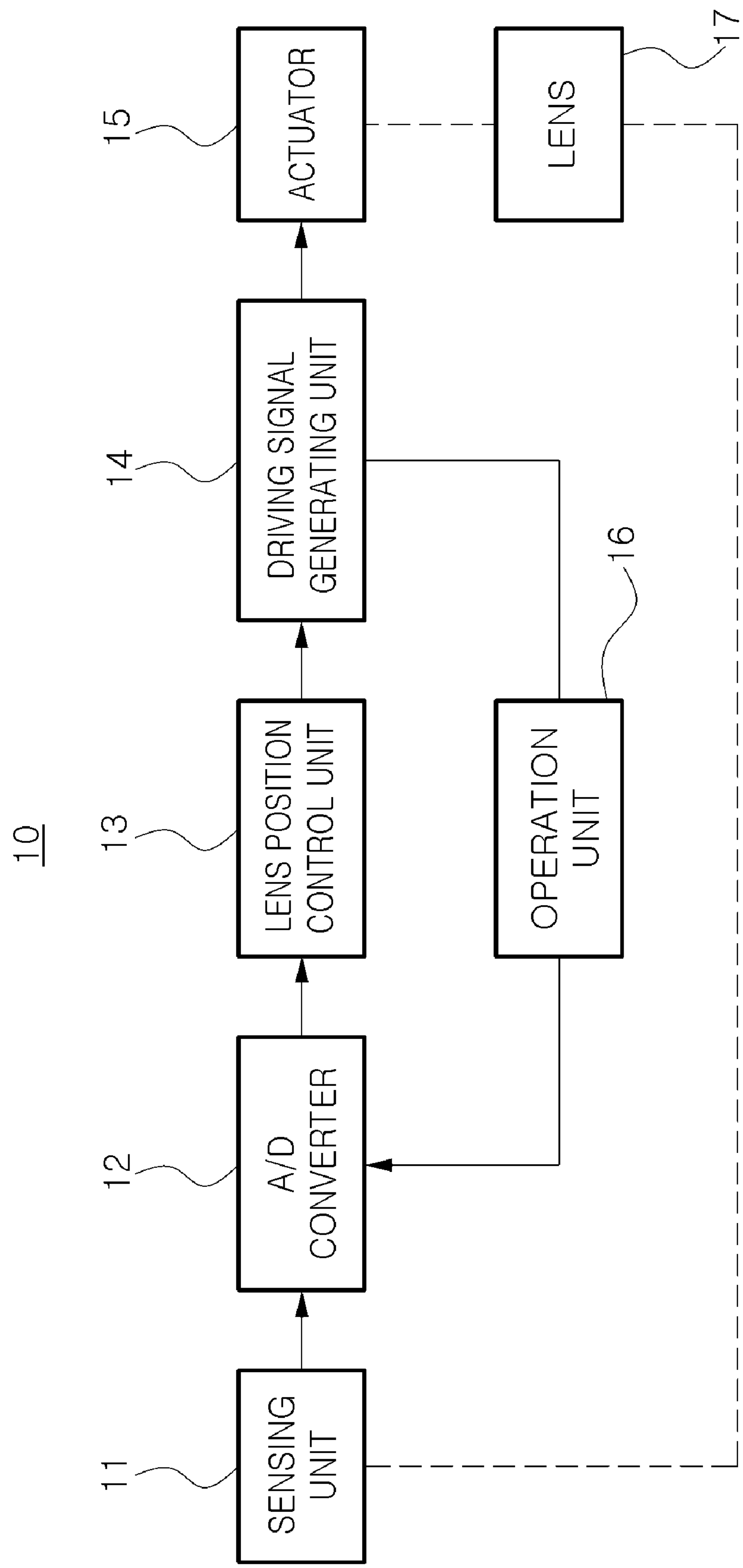
FIG. 2

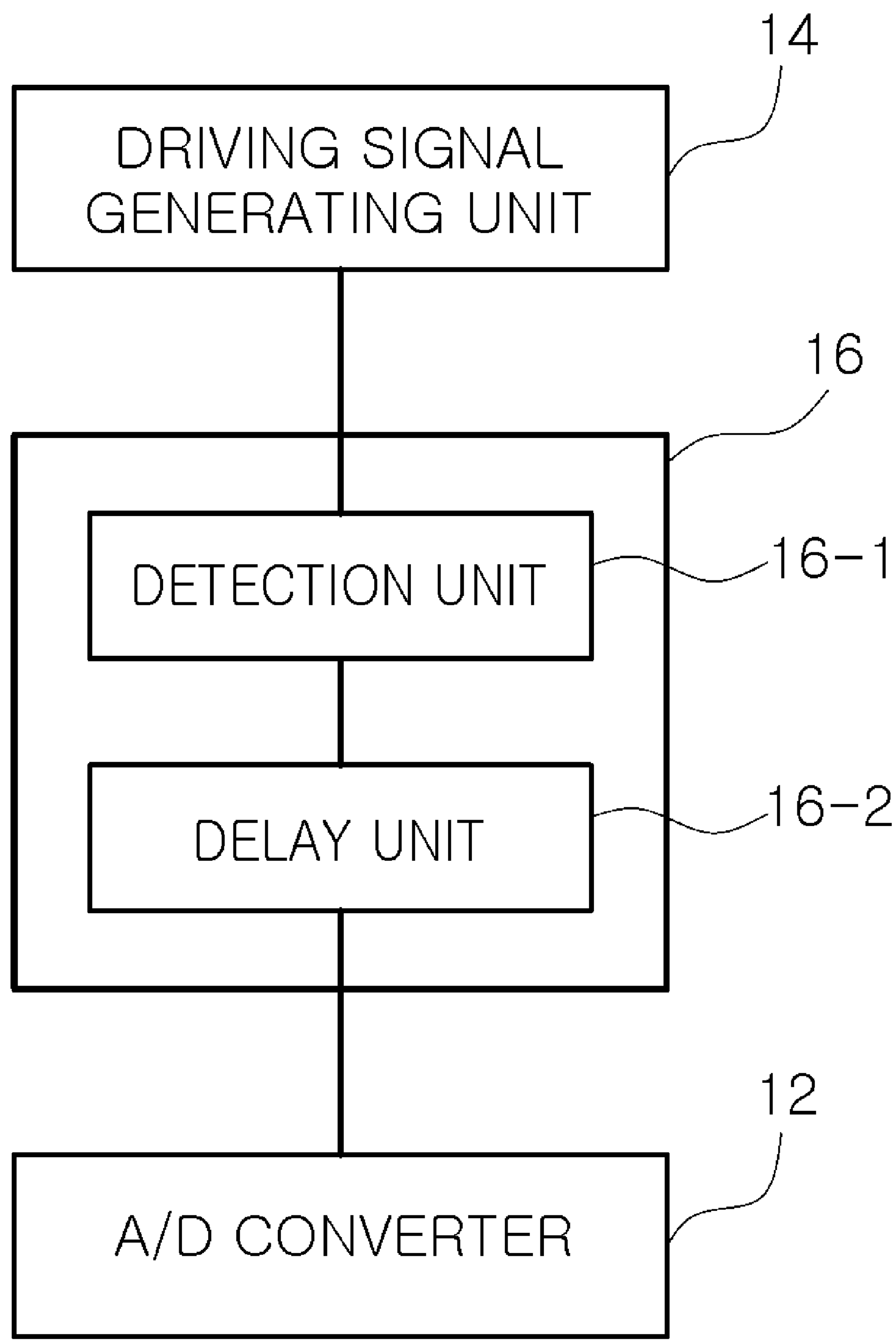
FIG. 3A

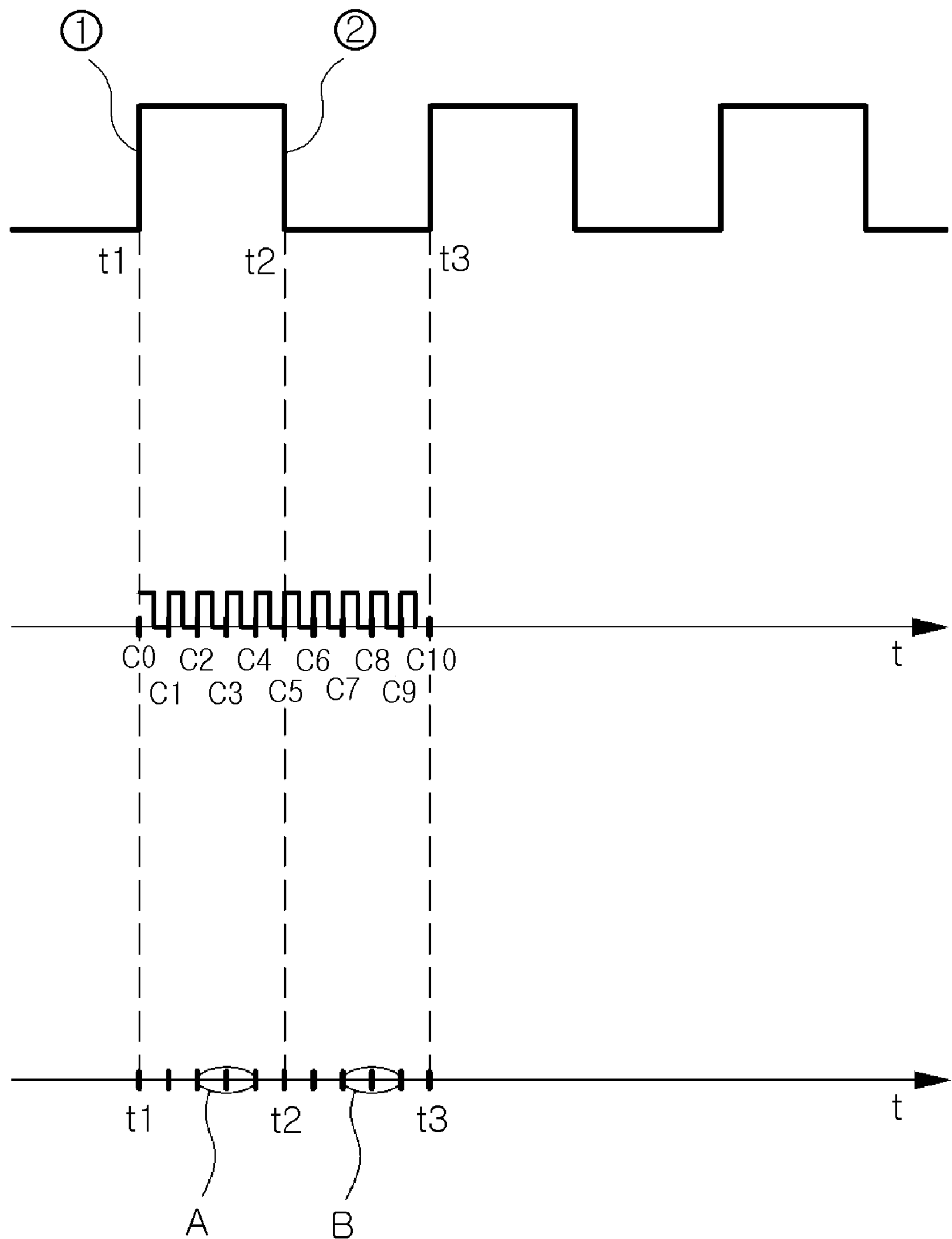
FIG. 3B

APPARATUS FOR AUTO FOCUSING

CROSS-REFERENCE TO RELATED APPLICATIONS

This application claims the priority of Korean Patent Application No. 2007-0063652 filed on Jun. 27, 2007, in the Korean Intellectual Property Office, the disclosure of which is incorporated herein by reference.

BACKGROUND OF THE INVENTION

1. Field of the Invention

The present invention relates to an apparatus for auto focusing, and more particularly, to an apparatus for auto focusing that can remove noise caused by an actuator driving signal when sensing a position of a lens.

2. Description of the Related Art

With the development in techniques for digital cameras, auto focusing that automatically adjusts focus of a camera has attracted much attention. In particular, the camera module has emerged as an essential function for a mobile terminal like a cellular phone, and thus the importance of associated additional functions has been increased. In order to implement the currently commercialized auto-focusing, displacement of a lens needs to be applied. To this end, an actuator like a motor is being used. Representative examples of the actuator may include a voce coil actuator (VCA) and a piezoelectric actuator. As the cellular phone is reduced in size and consumes less power, the camera module and an auto-focusing module also need to have low power consumption and small size.

In general, the auto-focusing module may include a sensing unit that senses a position of a lens and an actuator that changes the sensed position of the lens. The piezoelectric actuator has been widely used in the camera module since it has low power consumption and small size. However, the piezoelectric actuator has a high peak current while driving, which may act as noise in the sensing unit that senses the position of the lens.

FIGS. 1A and 1B are graphs illustrating noise occurring in the sensing unit by a square wave signal of an actuator in an apparatus for auto-focusing according to the related art.

In FIG. 1B, a driving signal for driving a piezoelectric actuator is shown. The driving signal may be a square wave signal having a rising edge ①' and a falling edge ②'. In FIG. 1A, a sensing voltage in the sensing unit is shown. As shown in FIG. 1A, noise components ① and ② occur in the sensing voltage at the edges of the actuator driving signal.

SUMMARY OF THE INVENTION

An aspect of the present invention provides an apparatus for auto focusing that prevents generation of noise in a sensing voltage generated by a sensing unit by a square wave of a driving signal of an actuator.

According to an aspect of the present invention, there is provided an apparatus for auto-focusing including: a sensing unit sensing a current position of a lens moving within a predetermined range along a moving shaft; an A/D converter converting a lens position value from the sensing unit into a digital signal; a lens position control unit generating a signal for moving the lens to a target lens position determined by an auto-focusing algorithm; a driving signal generating unit generating a square wave signal according to the signal from the lens position control unit; and an operation unit connected to the A/D converter and controlling a time at which the A/D converter performs conversion according to the square wave signal from the driving signal generating unit.

The apparatus may further include an actuator driven by the square wave signal from the driving signal generating unit.

The actuator may use a piezoelectric element.

The operation unit may include: a detection unit detecting edges of the square wave signal generated from the driving signal generating unit; and a delay unit controlling the time at which the A/D converter performs conversion so that the A/D conversion is performed on a signal from the sensing unit after a predetermined period of time elapses from a time at which the edges are detected.

The delay unit may control the time to perform conversion so that the A/D conversion is performed on the signal from the sensing unit between the time at which the edges of the square wave signal are detected and a time at which next edges thereof are detected.

The delay unit may be a counter dividing an interval between the time at which the edges are detected and the time at which the next edges are detected into a plurality of clocks.

BRIEF DESCRIPTION OF THE DRAWINGS

The above and other aspects, features and other advantages of the present invention will be more clearly understood from the following detailed description taken in conjunction with the accompanying drawings, in which:

FIG. 1A is a view illustrating noise that may occur in a driving signal in an apparatus for auto-focusing according to the related art;

FIG. 1B is a view illustrating the driving signal of FIG. 1A;

FIG. 2 is a configuration view illustrating an apparatus for auto-focusing according to an exemplary embodiment of the present invention;

FIG. 3A is a configuration view illustrating an operation unit of an apparatus for auto-focusing according to another exemplary embodiment of the present invention; and FIG. 3B is a graph illustrating a signal in the operation unit of FIG. 3A.

DETAILED DESCRIPTION OF THE PREFERRED EMBODIMENT

Exemplary embodiments of the present invention will now be described in detail with reference to the accompanying drawings.

FIG. 2 is a configuration view illustrating an apparatus for auto-focusing (hereinafter, referred to as an "auto-focusing apparatus") according to an exemplary embodiment of the present invention. Referring to FIG. 2, an auto-focusing apparatus 10 according to this embodiment may include a sensing unit 11, an A/D converter 12, a lens position control unit 13, a driving signal generating unit 14, an actuator 15, and an operation unit 16.

The auto-focusing apparatus 10 moves a lens within a focus range from macro to infinity so that the lens is moved to the position of optimum focus of the lens. The auto-focusing apparatus 10 sets a plurality of target positions by using an auto-focusing algorithm, moves the lens to each of the plurality of target positions, and determines the sharpness of a screen at each target position. The auto-focusing apparatus 10 determines as an optimum focus position, the target position at which the highest sharpness of the screen can be obtained among the plurality of target positions and moves the lens to the optimum focus position.

The sensing unit 11 is connected to the lens 17 and senses a position of the lens 17. In the auto-focusing apparatus 10, the lens 17 may move along a moving shaft. The lens may move within the focus range from macro to infinity. The range in which the lens 17 moves means a mechanical moving distance at which the lens 17 in a camera module can move.

The sensing unit 11 may include a position sensor in the moving shaft of the lens to detect the position of the lens 17.

The sharpness with respect to a subject may vary according to the position of the lens. An image incident through the lens 17 can be recognized by an image sensor or the like.

The A/D converter 12 can convert a lens position value corresponding to the lens position sensed by the sensing unit 11 into a digital signal. In general, since the position value of the lens position sensed by the sensing unit 11 corresponds to an analog signal, the A/D converter 12 converts the analog signal into the digital signal and provides the digital signal to the lens position control unit 13.

In general, since the A/D converter operates at an arbitrary time, the A/D converter may be affected by a square wave or the like. In this embodiment, a time at which the A/D converter converts the analog signal obtained by the sensing operation of the sensing unit 11 into the digital signal is controlled so that the A/D converter can operate at a time when there is no noise component from the outside.

The lens position control unit 13 generates a signal for changing the current position of the lens 17 to a target position of the lens 17. The lens position control unit 13 may execute an auto-focusing algorithm to set the target position.

The auto-focusing algorithm is executed to determine a plurality of target positions within the movement range of the lens, move the lens to each of the target positions, and make comparison in sharpness at the target positions where the lens is located. With the auto-focusing algorithm, the optimum focus position providing the greatest sharpness can be sensed. When the optimum focus position is sensed, the auto-focusing algorithm is executed to output a signal for moving the lens to the optimum focus position.

At this time, an actuator for driving the lens is required to perform an operation of moving the lens to each of the plurality of predetermined target positions to locate the optimum focus position and an operation of moving the lens to the optimum focus position. The driving signal provided to the actuator can be determined by the auto-focusing algorithm.

The driving signal generating unit 14 generates a signal for driving the actuator 15 that is connected to the lens and moves the lens.

In this embodiment, a piezoelectric actuator may be used as the actuator 15. The piezoelectric actuator is a transducer that converts electric energy into mechanical displacement or stress by using a piezoelectric method.

The driving signal generating unit 14 may generate a square wave signal in order to drive the piezoelectric actuator.

In the square wave signal, an active mode and a sleep mode are repeated. A large variation in electric current occurs at the falling edge and the rising edge between the active mode and the sleep mode. Such a sudden change in current may act as noise when the sensing unit 11 senses the position of the lens. The noise may prevent accurate sensing of the position of the lens.

The operation unit 16 may control a time at which the A/D converter 12 performs conversion according to the square wave signal from the driving signal generating unit 14.

At this time, the operation unit 16 detects edges of the square wave signal output from driving signal generating unit 14 that may act as noise in the sensing unit 11 and controls a time at which the A/D conversion with respect to the lens position can be performed in a region except for the edges.

As described above, in this embodiment, the output signal of the driving signal generating unit 14 is sensed, and the output signal of the driving signal generating unit 14 from which a signal region causing noise is removed is fed back into the A/D converter 12, thereby preventing noise generation.

FIGS. 3A and 3B are views illustrating an operation unit used in an auto-focusing apparatus 100 according to another exemplary embodiment of the present invention.

Referring to FIG. 3A, the auto-focusing apparatus 100 according to this embodiment includes an operation unit 16 that feedbacks a signal from a driving signal generating unit 14 into an A/D converter 12. The operation unit 16 may include a detection unit 16-1 and a delay unit 16-2.

The driving signal generating unit 14 may generate a square wave signal to drive a piezoelectric actuator.

The A/D converter 12 converts a lens position value corresponding to the lens position sensed by the sensing unit 11 into a digital value.

The detection unit 16-1 detects edge portions of the square wave signal generated by the driving signal generating unit 14.

The delay unit 16-2 delays an operating time of the A/D converter so that the A/D converter operates at any time except for a time corresponding to the edge portions detected by the detection unit 16-1. The delay unit 16-2 may be variously realized as long as it can control the operating time of the A/D converter.

In FIG. 3B, the square wave signal generated by the driving signal generating unit 14, a clock signal generated for the operation unit 16 to control a time at which A/D conversion is performed, and the time at which the A/D converter 12 performs the A/D conversion are shown.

Referring to FIG. 3B, the detection unit 16-1 detects edge portions ①' and ②' of the square wave signal generated by the driving signal generating unit 14. In the square wave signal generated by the driving signal generating unit 14, a rising edge ①' and a falling edge ②' are repeated. A large current change occurs in the edge portions of the square wave signal, and the edge portions may act as noise in the A/D converter 12.

The detection unit 16-1 may detect the edge portions of the square wave signal and provide a reference time at which the delay unit 16-2 can operate.

The delay unit 16-2 may control the A/D converter 12 so that the A/D converter 12 operates after a predetermined period of time from a time t1 at which the edge portions are detected.

In this embodiment, the delay unit 16-2 may be a counter that divides an interval between the rising edge and the falling edge of the square wave signal generated by the driving signal generating unit into five clocks. The delay unit 16-2 can control the AD conversion time so that the AD conversion starts to be performed after predetermined clocks from each of the rising edge time and the falling edge time.

In this embodiment, the delay unit 16-2 is set so that AD conversion starts after two clocks c1 and c2 from a time t1 at which the rising edge ① of the square wave signal is detected. The AD conversion may continue for the two clocks c3 and c4.

Further, since noise occurs in the square wave signal at rising and falling edges, the delay unit 16-2 may be set so that A/D conversion starts after two clocks c6 and c7 from a time t2 at which the falling edge ②' of the square wave signal is detected. The A/D conversion may continue for two clocks c8 and c9.

As described above, in this embodiment, the A/D converter may operate its operation after a predetermined period of time from the falling edge and the rising edge.

Therefore, the A/D converter 12 may convert the analog signal with respect to the lens position sensed by the sensing unit 11 into the digital signal at times A and B. The A/D conversion time is controlled to avoid times at which edges of the square wave signal generated by the driving signal generating unit 14 are detected, such that noise caused by the square wave signal generated by the driving signal generating unit 14 can be blocked.

According to this embodiment, the square wave signal generated by the driving signal generating unit is fed back into the A/D converter to control the operating time of the A/D converter, such that, noise that may occur when sensing the lens position can be prevented and the lens position can be accurately sensed.

As set forth above, according to the exemplary embodiments of the invention, when the position of the lens is sensed for auto-focusing, noise that may occur due to an actuator driving signal can be removed and the lens position can be accurately sensed.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for auto-focusing comprising:

a sensing unit for sensing a current position of a lens moving within a predetermined range along a moving shaft;

an A/D converter for converting a lens position value from the sensing unit into a digital signal;

a lens position control unit for generating a signal for moving the lens to a target lens position determined by an auto-focusing algorithm;

a driving signal generating unit for generating a square wave signal according to the signal from the lens position control unit; and an operation unit connected to the A/D converter and configured to control a time at which the A/D converter performs conversion according to the square wave signal from the driving signal generating unit;

wherein the operation unit comprises:

a detection unit for detecting edges of the square wave signal generated from the driving signal generating unit; and a delay unit for controlling the time at which the A/D converter performs conversion so that the A/D conversion is performed on a signal from the sensing unit after a predetermined period of time elapses from a time at which the edges are detected.

2. The apparatus of claim 1, further comprising:

an actuator driven by the square wave signal from the driving signal generating unit.

3. The apparatus of claim 2, wherein the actuator uses a piezoelectric element.

4. The apparatus of claim 1, wherein the delay unit is configured to control the time to perform conversion so that the A/D conversion is performed on the signal from the sensing unit between the time at which the edges of the square wave signal are detected and a time at which next edges thereof are detected.

5. The apparatus of claim 4, wherein the delay unit is a counter dividing an interval between the time at which the edges are detected and the time at which the next edges are detected into a plurality of clocks.

6. The apparatus of claim 5, wherein the delay unit is configured to start the A/D conversion after a predetermined number of clocks from each of the edges of the square wave are detected.

* * * * *